Aug. 18, 1942.    G. CHILD    2,293,115
WINDSHIELD WIPER
Filed Aug. 23, 1940
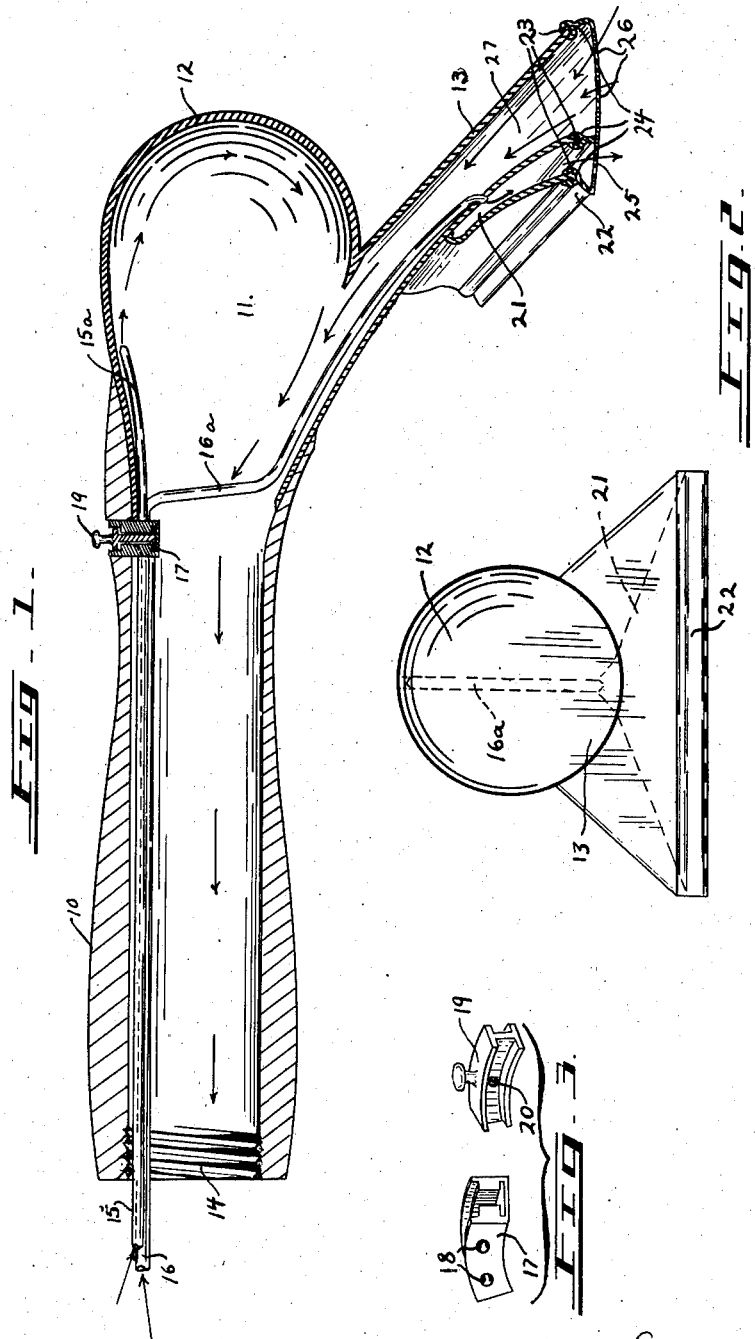
INVENTOR
George Child
By Ralph Burch
Attorney / Patented Aug. 18, 1942

2,293,115

UNITED STATES PATENT OFFICE 2,293,115

WINDSHIELD WIPER

George Child, Vancouver, British Columbia, Canada; Frederick C. Aubrey administrator of said George Child, deceased Application August 23, 1940, Serial No. 353,934

4 Claims. (Cl. 15—4)

This invention relates to new and useful improvements in a windshield wiper. Its primary object being to provide means to clean automobile windshields, windows and the like.

A further object of the invention is to devise a windshield wiper to be used manually by a service station attendant, said windshield wiper having a hose attached thereto with conduits therein for water and compressed air and valve means associated therewith to control the same.

Another object of the invention is to provide a windshield wiper having means delivering water to a part of the working surface of the cleaner and creating suction at the remainder of the surface to dry the windshield.

With these and other objects in view the invention consists in the novel construction and arrangement of parts as hereinafter more specifically set forth, claimed and shown in the accompanying drawing forming part of this application and in which:

Fig. 1 is a sectional elevation through my improved windshield wiper.

Fig. 2 is an end elevation of the same.

Fig. 3 is a perspective view of the valve elements.

Referring more in detail in the drawing in which similar reference characters designate corresponding parts throughout the several views it will be seen the invention consists of a tubular body forming a handle 10. Secured on the end thereof is a metal casing 11, including a semispherical member 12, and an angular head 13, depending therefrom.

The handle 10, is arranged to receive a hose in the threaded end 14 and conduits 15 and 16 inside the same. The former is connected to a compressed air supply and the latter to a water supply. Both conduits are connected to a valve receptacle 17 which is provided with two apertures 18. A slide valve 19 having only one aperture 20, therein is arranged to be registered with one or the other of the said apertures 18 to control the passage of air or water therethrough. The conduits are continued into the casing 11, the air conduit 15a, extending into the member 12, and the water conduit 16a, extending downward into a water passage 21, formed in the back of the head 13.

The cleaning element 22 may be constructed of rubber composition or any other suitable material and is removable for cleaning or replacement. Rolled edges 23 are formed on the lower ends of the head 13, and the member 22, is secured thereon by moulded gripper edges 24. Apertures 25 are formed in the element 22, which register with the water passage and permit the water to pass out to the windshield. Similar apertures 26 are formed in the front part of the element 22 which register with the air passage 27.

From the foregoing description it will be seen that the water is conveyed to the cleaner surface by the conduits and manipulation of valve. Then the water is shut off and the air is permitted to flow through the air conduit and into the semispherical portion which reverses the direction of the air and causes a partial vacuum and consequently a suction in the air passage 27, which draws water or moisture from the windshield and thus dries the same. The air and water are thus discharged through the hose attached to the handle.

While the invention has been described as a windshield wiper it is not limited to this function but may be adapted for cleaning numerous objects where water pressure and compressed air are available, or the device may be adapted in combination with an air and water pump to form a self-contained portable cleaning equipment.

It is believed that the construction and advantages of the structure shown may be apparent from the foregoing paragraphs taken in conjunction with the accompanying drawing without further detailed description.

While the preferred embodiment of the invention has been disclosed it is understood that minor changes in the details of construction, combination and arrangement of cooperating elements may be resorted to within the scope of what is claimed without departing from the spirit of the invention.

I claim:

1. A cleaning device of the character described comprising a tubular body having a semi-spherical wall at one end, a hollow head depending from said body inwardly of said end wall, said head having its lower end divided into separate water and air passages, said air passage being in communication with said body, means for conducting water to the water passage, and means within said body extending along the top thereof to a point adjacent the end wall for directing a flow of air against the upper portion of the semi-spherical wall of said body whereby the flow of air is reversed and caused to flow backwardly across the opening establishing communication between the body and said head thus creating a suction in the air passage of said head.

2. A cleaning device of the character described comprising a tubular body forming a handle, a casing secured to one end of said handle having a semi-spherical end wall, a hollow head depending from said casing inwardly from the end wall, said head having its lower end divided by a partition to form water and air passages, means for supplying water to the water passage of said head, and means within said body extending along the top thereof to a point adjacent the end wall of said casing for directing a flow of air against the upper portion of the semi-spherical wall of said casing whereby the flow of air is reversed and caused to flow backwardly across the opening establishing communication between the body and said head thus creating a suction in the air passage of said head.

3. A cleaning device of the character described comprising a tubular body forming a handle, a casing secured to one end of said handle having a semi-spherical end wall, a hollow head depending from said casing inwardly from the end wall thereof, said head having a partition wall in its lower end dividing the head to form water and air passages, a water conduit extending longitudinally of said handle having communication with the water passage of said head, an air conduit extending longitudinally of said handle and terminating adjacent the upper portion of the end wall of said casing adapted to direct a flow of air against the end wall of said casing whereby the flow of air is reversed and caused to flow backwardly across the opening establishing communication between said head and casing, thus creating a suction in the air passage of said head.

4. A cleaning device of the character described comprising a tubular body having a semi-spherical end wall at one end, a hollow head depending from said body at a point inwardly from the end wall of said body and having communication with said body, and an air conduit extending longitudinally of said body having its discharge end disposed adjacent the upper portion of the semi-spherical end wall for directing a flow of air against said end wall whereby the direction of the flow of air is reversed so that the air flows backwardly in the body across the opening establishing communication between the body and head thus creating upward suction in said head.

GEORGE CHILD.